R. SHIELDS.
TROLLEY RETRIEVER AND CATCHER.
APPLICATION FILED JAN. 21, 1911.

1,023,597.

Patented Apr. 16, 1912.
6 SHEETS—SHEET 1.

WITNESSES:
A. C. Fairbanks.
J. M. Davenport.

INVENTOR.
Robert Shields,
BY Webster & Co.,
ATTORNEYS.

R. SHIELDS.
TROLLEY RETRIEVER AND CATCHER.
APPLICATION FILED JAN. 21, 1911.

1,023,597.

Patented Apr. 16, 1912.
6 SHEETS—SHEET 2.

WITNESSES:
A. C. Fairbanks.
J. M. Davenport

INVENTOR.
Robert Shields,
BY
Webster & Co.,
ATTORNEYS.

R. SHIELDS.
TROLLEY RETRIEVER AND CATCHER.
APPLICATION FILED JAN. 21, 1911.

1,023,597.

Patented Apr. 16, 1912.
6 SHEETS—SHEET 4.

WITNESSES:
A. C. Fairbanks.
J. M. Davenport.

INVENTOR.
Robert Shields
BY
Webster & Co.,
ATTORNEYS.

R. SHIELDS.
TROLLEY RETRIEVER AND CATCHER.
APPLICATION FILED JAN. 21, 1911.

1,023,597.

Patented Apr. 16, 1912.
6 SHEETS—SHEET 5.

WITNESSES:
A. C. Fairbanks.
J. M. Davenport.

INVENTOR.
Robert Shields,
BY
Webster & Co.,
ATTORNEYS.

R. SHIELDS.
TROLLEY RETRIEVER AND CATCHER.
APPLICATION FILED JAN. 21, 1911.

1,023,597.

Patented Apr. 16, 1912.
6 SHEETS—SHEET 6.

WITNESSES:
A. C. Fairbanks.
J. M. Davenport.

INVENTOR.
Robert Shields,
BY
Webster & Co.,
ATTORNEYS.

ature, have the kind permission to read any state or comment, or prior use of any such prior-art reference.

UNITED STATES PATENT OFFICE.

ROBERT SHIELDS, OF SOUTH BOSTON, MASSACHUSETTS, ASSIGNOR TO FRANK RIDLON COMPANY, OF BOSTON, MASSACHUSETTS, A CORPORATION OF MASSACHUSETTS.

TROLLEY RETRIEVER AND CATCHER.

1,023,597.  Specification of Letters Patent.  Patented Apr. 16, 1912.

Application filed January 21, 1911. Serial No. 603,797.

*To all whom it may concern:*

Be it known that I, ROBERT SHIELDS, a citizen of the United States of America, residing at South Boston, in the county of Suffolk and State of Massachusetts, have invented new and useful Improvements in Trolley Retrievers and Catchers, of which the following is a specification.

My invention relates to improvements in devices for catching the trolley pole when it accidentally leaves the conductor, and to mechanism for drawing the pole downward, thus preventing it being maintained at a height where it is likely to encounter the overhead structure and cause damage.

The object of my invention is to provide a device more efficient in operation and more easy in manipulation than any heretofore made.

The object is further to improve the construction in various details whereby the disadvantages heretofore existing are overcome.

Among the difficulties heretofore existing with trolley retrievers has been the difficulty of setting the retriever spring, this having been heretofore accomplished generally by drawing upon the trolley rope by hand until the retrieving spring was wound to the desired extent.

This is extremely difficult and often dangerous, and one of the objects of my invention is to produce a retriever with which the retriever spring is wound up or as it is termed "set" from the outside without the necessity of drawing upon the trolley rope, and also without being required to directly manipulate any portion of the interior mechanism.

Other objects are to produce an improved device comparatively simple in construction, positive in operation, compact, and adapted to withstand the shock and jar incident to the operation of devices of this character without danger of breaking or disarranging it, and further, to provide a retriever which may be readily converted into a catcher, so that the device may be used as a retriever or as a catcher, independently.

Referring now to the drawings

Similar figures refer to similar parts throughout the several views.

The retriever comprises, generally and preferably, a tri-section casing and a supporting member therefor, with convenient means for locking and releasing said casing to and from said supporting member, such casing consisting of front and back fixed sections and an intermediate rotatable section, an axial stud projecting forwardly from the back casing section, a retriever spring in said back section, a retriever disk on such stud under the influence of such spring, engaging and releasing means between said rotatable section and said back section, engaging and releasing means between said disk and said rotatable section, a reel also on said stud, engaging and releasing means between said reel and said disk, a reel spring, and means to retain the members in place and bind them together. The drawings illustrate the embodiment of these features in a practical device, also two modifications, but it is to be understood that I do not wish or intend to be restricted to such constructions, as I seek to include within the scope of my claims any and all other modifications to which I am entitled, and to claim broadly any means, other than the trolley rope, for winding or setting the retriever spring from the outside of the case or casing.

Having reference to the drawings, I will first describe the casing or case and the mechanism therein which constitute the preferred form of my invention. The aforesaid casing consists of a fixed back section 1, which is fastened in some suitable manner and by some suitable means to a dasher or other convenient part of a car, but preferably by the means and in the manner hereinafter described, a rotatable or winding intermediate section 2, and a fixed front section 3, the latter being provided with a hollow extension or projection 4, for a trolley rope 5, and with a hand-hole 6. The three case sections are annular. The front and back sections are respectively closed at their front and back ends, and the intermediate section has a closed back. Oppositely-disposed ears 7—7 project from the periphery of the case section 1 at the rear, and a series of teeth 8 is formed on said periphery at the front. Within said back section is a retriever spring 9 having its outer terminal engaged and held by a hook 11 in the spring chamber and integral with the wall of such chamber. The axial stud 12 has its rear end set firmly and rigidly in the center of the back section. On the back side of the case section 2 is a flange 13 which fits into an annular groove 13$^a$ just inside of the front edge of the case section 1, and surrounding said first-mentioned section is a hand-grip 14 made somewhat after the style of a tiller-wheel, such hand-grip being designed to be grasped for the purpose of rotating said section. This rotatable section carries a pawl 80 behind for engagement with the teeth 8, such pawl being mounted on a stud 16, which projects rearwardly from said section or from a boss 17 between the section and the hand-grip 14, and being urged constantly toward the periphery of the case 1 and into engagement with said teeth by means of a spring 18. The spring 18 lies in an annular groove 19 on the boss 17, around the stud 16, so as to be out of the way of the pawl 80, and has one end bent rearwardly, at 20, to enter said boss, and the other end bent forwardly, at 21, to enter said pawl. The section 2 can be rotated freely in the direction of arrow 22, in Fig. 6, but cannot be rotated in the opposite direction, owing to the presence of the teeth 8 and the pawl 80 and to their engagement. Within and located against the walls or rim of the section 2 are two oppositely-disposed abutments 23, and there is a central opening 24 in the back of such section.

A retriever disk 25 is contained in the case section 2, and this disk has a hub 26 which extends from the back thereof, through the opening 24, into the case section 1. The disk 25, with its hub 26, is mounted loosely on the stud 12, and the inner end of the retriever spring 9 engages said hub, which latter is provided with one or more longitudinal peripheral slots or teeth 27 for that purpose. The shape of the teeth 27 is such that, when the disk 25 is rotated in the direction to wind up the spring 9, the latter will be held to the hub 26 by means of one of said teeth, but when said disk is rotated in the opposite direction and in the event said spring has expanded to its full extent said teeth will pass the bent end of the spring without operatively engaging the same. The slip connection thus formed provides against possible danger of breaking the retriever spring whenever the retriever disk rotates or is rotated, after said spring has expended its force, in the direction which corresponds to that which said spring gives to said disk.

Set into and operating in a recessed part 28 in the back side of the retriever disk 25 is an oscillatory and reciprocatory dog or latch 29. The latch 29 has a slot 30 therein and this slotted part is mounted on a stud 31 which projects rearwardly from the aforesaid recessed portion of the disk 25. Said latch has a heel 32 which may project in part beyond the periphery of the disk 25, and the latter is provided with a V-shaped abutment 33 for said heel. Two notches 34 and 35 are made in the inner edge of the latch 29, and an outwardly spring-pressed pin or plunger 36 having an angular head 37 is provided to engage the notched parts of said latch, such pin or plunger being received in a radial passage 38 in the disk 25, with a spring 39 between the inner end of said passage and the inner end of said pin, and carrying its head in the recess 28. The nose or beak of the latch 29 consists in part of a forwardly-extending lug 40, for the accommodation of which there is a notch 41 formed in the periphery of the disk. The latch acts to lock the disk to the case section 2 and release it therefrom, direct engagement between the parts being had by means of the beak of said latch and either of the abutments 23. The operation of this latch mechanism will be fully explained presently.

Figure 10:
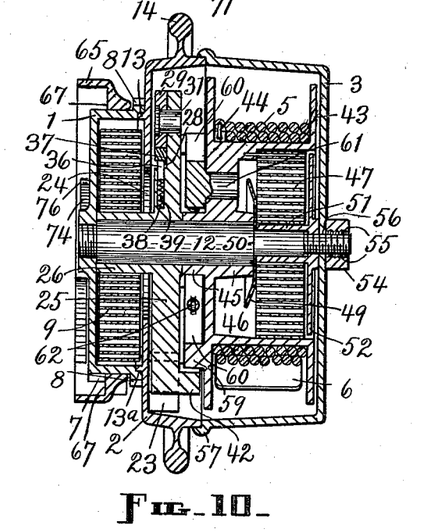
Fig. 10, a section through the complete device, taken on lines 10—10, looking in the direction of the associated arrows, in Figs. 1, 2, 3, 4, 5 and 9.

On the front side at the periphery of the retriever disk 25 are three lugs 42 arranged equidistant from each other. Next in order on the stud 12, after the winding case section 2 (which is supported directly on the back case section 1 and not on said stud) and the retriever disk 25, is a reel 43 for the trolley rope 5 which is attached thereto at 44, Fig. 10. The reel 43 has a hub 45 and like the retriever disk 25 is free to revolve on the stud 12, both said reel and said disk being mounted on an enlarged part of said stud, with the rear end of the disk hub 26 bearing against the back of the case section 1 and the rear end of the reel hub bearing against the front face of said disk. Within the reel 43 is a chamber 46 in which is a spring 47 having its outer end secured to a post 48 in said chamber. A plate or washer 49 is placed on the stud 12 to serve as a backing for the spring 47. The washer 49 is held against a shouldered part 50 of the stud 12 and the front end of the reel hub 45 by the rear end of a hub 51. The hub 51 is on the back side of a disk or plate 52 mounted on the stud 12, and said hub has a longitudinal slot 53, Fig. 1, therein to receive the bent inner end of the reel spring. The front terminal of the stud 12 is screw-threaded to receive a nut 54, and this portion of said stud has one or more flattened surfaces, as shown at 55, in Figs. 1, 3, 5 and 10, and the opening in the plate 52 through which said stud extends is made to conform to the mutilated part or parts of the stud, so that said plate is prevented from turning. The plate 52 closes the front of the chamber 46 and confines between it and the washer 49, laterally, the reel spring. The front of the case section 3 has an opening 56 in the center thereof, which also conforms to the aforesaid mutilated part or parts of the stud 12 so as to properly position said section, and the latter is placed on said stud before the nut 54 is screwed on.
The nut 54, when tightened, forces the case section 3 against the plate 52 and, with the case section 1, holds the members which are mounted on the stud 12 against endwise movement. The back edge of the case section 3 is in the form of a bead 57 which is adapted to fit over the front edge of the case section 2. The section 3 is placed on the stud 12 in such a way as to locate the projection 4 in a vertical position, with the hand-hole 6 at the bottom.

Figure 1:
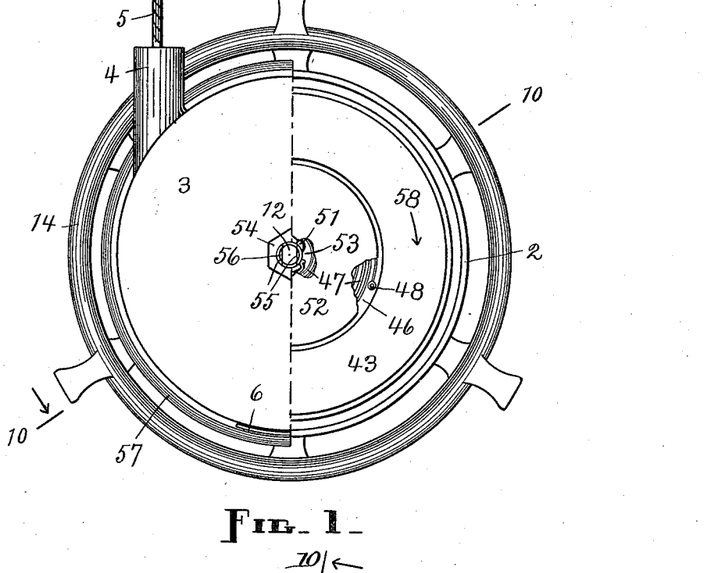
—Figure 1 is a front elevation of a retriever which embodies my invention in a practical form, one-half of the front section of the case and of the confining nut on the stud for said section and other parts of the device being cut away, and portions of the cover or face plate for the reel chamber being broken out to disclose the reel spring and the attachments therefor.
Figure 2:
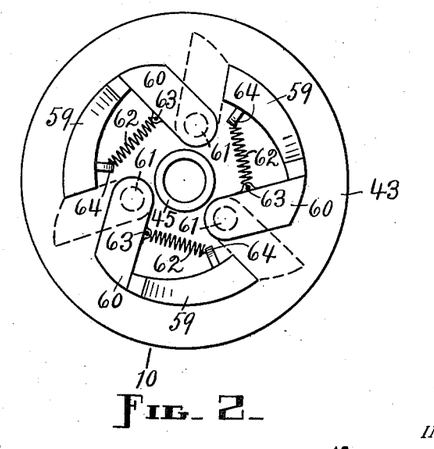
Fig. 2, a rear elevation of the reel, showing the dogs in their normal or retracted positions in full lines and in their outward positions in dotted lines.

When the reel 43 is revolved in the direction of arrow 58, in Fig. 1, the spring 47 will be wound up, since the hub 51, to which the inner end of said spring is attached, is stationary. The reel 47 is equipped on the back with a plurality of abutments 59 and pawls or dogs 60, there being three of each in the present case, although this number may vary. The abutments 59 are fixed immovably to the reel, but the dogs 60 are pivotally connected therewith, the inner end of each of the latter either being mounted on a pin extending rearwardly from said reel, or having a stud which enters a hole in the back of the reel, 61 representing such pivot or stud. In one case the dog turns on its pin and in the other case the pin or stud turns with the dog. Each dog 60 is so formed and located that its movement in one direction is limited by the adjacent end of one abutment 59 and in the other direction by the adjacent end of another abutment, so that it can oscillate between and contact with two adjacent abutments. The dogs are drawn inward normally with their outer ends or heads in contact with what may be termed the heels of the abutments 59 by means of light springs 62. Each spring 62 has one end fastened to a dog at 63 and the other end fastened at 64 to the abutment which is ahead, in the direction of rotation indicated by the arrow 58, of said dog. The lugs 42 are outside of the path of travel of the abutments 59, and the dogs 60 when in normal position also clear said lugs. Said dogs remain in normal position while the reel revolves, in the direction of the arrow 58, with a comparatively steady and even motion which is insufficient to overcome by centrifugal force the force of the springs 62, but under sudden acceleration of speed imparted to the reel, in this direction, as when the trolley-wheel slips from the wire and the rope attached to the trolley-pole is suddenly jerked upward, the force of said springs is overcome and the dogs swing outward until their heads contact with the heads inside of the heels of the abutments 59, each dog now bearing against the abutments behind, in the direction of rotation, that against which it had previously rested, as indicated by dotted lines, in Fig. 2. The lugs 42 are now in the path of the dogs and are engaged by them.

A supporting ring 65 is provided for the retriever. This ring has two or more lugs 66 at the back for fastening it to the dasher or other convenient part of a car, and said ring also has two interior flanges 67 separated by oppositely-disposed openings or notches 68—68 situated immediately adjacent to said lugs. In other words, each flange 67 extends from one of the lugs 66, or from that part of the ring 65 where one of said lugs is located and where there is a shoulder 69, to the adjacent edge of the notch 68 which is between said flange and the other lug. The flanges 67 together are of a size to receive the back case section 1, or that portion of such case section which is behind the teeth 8, and the notches 68 are each of a size to receive one of the ears 7 and permit it to pass through into alinement with the spaces behind said flanges.

Pivotally mounted on a stud 70, set in a lug 71 at the bottom of the ring 65, is a latch 72. The latch 72 has a handle 73 at its free end, a hook 74 on its upper or inner edge a little remote from said handle, and a tailpiece 75 at the left of the stud or pivot 70. A slot 76 is cut in the ring 65 for the accommodation of the latch hook 74, and the latch is yieldingly held, with said hook projecting through said slot behind the right-hand flange 67, by means of a spring 77 pocketed in said ring and bearing against the tailpiece 75 from above. The distance between the straight and approximately vertical part of the hook 74 and the adjacent shoulder 69 is equal to the width of either ear 7.

Figures 5, 6, 7, 8:
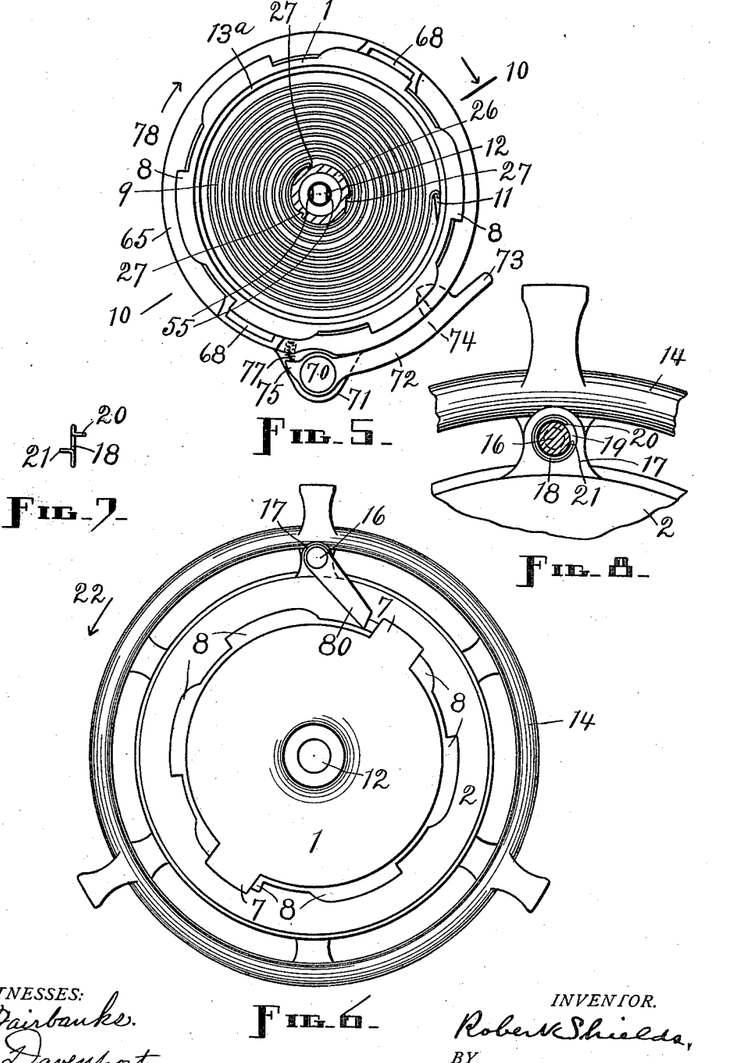
Fig. 5, a front elevation of the rear section of the case and the retriever spring and of the supporting ring, a portion of the retriever-disk sleeve also appearing, in section.
Fig. 6, a rear elevation of the back and winding sections of the case.
Fig. 7, an enlarged edge elevation of the winding-pawl spring.
Fig. 8, an enlarged detail, in partial section, showing the manner of applying said winding-pawl spring.
Figure 9:
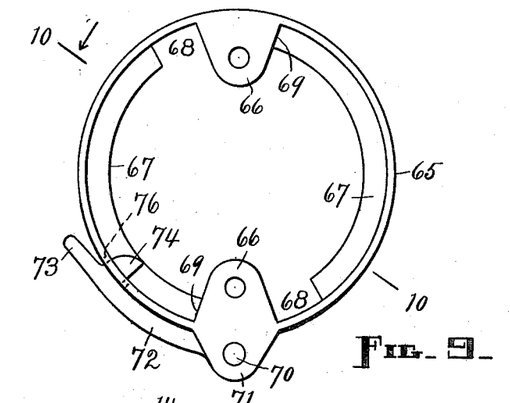
Fig. 9, a rear elevation of said supporting ring.

To secure the retriever to the ring 65, bring the ears 7 into alinement with the notches 68 and insert the case section 1 into said ring, and then rotate said section in the direction of arrow 78, in Fig. 5, the lugs 66 preventing rotation in the opposite direction, until said ears contact with the shoulders 69, when the parts will be locked by the latch 72. This last is true, because, as the section 1 is rotated into the position just mentioned, one of the ears 7 rides over the hook 74, the latch spring 77 yieldingly for that purpose, into the space between said hook and the adjacent shoulder 69, when said spring immediately acts to rock the latch into normal position again with said hook at the right of the ear in question. The other ear 7, which is the upper one as the parts are now positioned, is bearing against the upper shoulder 69. With the case section 1 held against rotation by the shoulders 9 and the latch 72, and with the ears 7 behind the flanges 67, said section and all that is supported therein and thereby are securely held in place, and they are held in proper position as well, since due attention is paid to the correlation of the parts in the matter of position wherever the same needs to be considered.

To remove the retriever from the ring 65, simply grasp the handle 73 and rock the latch 72 outwardly until the hook 74 clears the adjacent ear 7, and then rotate the case section 1, in the opposite direction to that indicated by the arrow 78, until the ears 7 come into registry with the notches 68, when said section is withdrawn from said ring.

Having described in detail the construction of my device, as illustrated in the first ten views, I will next proceed to explain the complete operation of the same, beginning with the initial setting of the mechanism, the retriever spring 9 and the reel spring 47 being loose, and continuing with the several subsequent actions thereof.

With the parts assembled and the retriever in place in the ring 65, it is first necessary to wind a few feet of the rope 5, which passes down through the projection 4, onto the reel 43. This is accomplished by inserting the hand into the case section 3, through the hand-hole 6, rotating the reel 43 in the direction of the arrow 58 Fig. 1, to wind up the spring 47, attaching said rope to said reel at 44, or to a short length of chain (not shown) which may be attached at said point, and then releasing said reel to said spring so that the rope will be wound on the reel. Next give the rope a sudden upward pull to cause the dogs 60 to fly outward and engage the lugs 42. The reel 43 and the retriever disk 25 are now locked together. The operator continues to pull on the rope and to draw it out of the projection 4, and so continues to rotate the reel, in the same direction as before, and with it the disk 25, which results in changing the position of the latch 29 in the following manner: Said latch, when the parts are assembled, occupies the position represented in full lines, in Fig. 4, with its heel 32 projecting beyond the periphery of the disk 25, in which position it is held by the spring-pressed plunger or pin 36, so that the projecting part of said heel is brought into contact with one of the abutments 23 in the winding case section 2, by the rotating disk, and is forced forward on the stud 31 which is in the slot 30, by the contacting abutment, with the ridge or apex 79 formed by and between the notches 34 and 35 bearing on the plunger head 37, but as soon as the beak of the latch rides clear of said abutment the plunger spring 39 acts to rock the latch on the stud 31 in such a way as to throw said beak out of the notch 41 against the rim of said section. The latch 29 in moving into this position, which is the position, approximately, indicated by dotted lines, in Fig. 4, slides over the plunger head 37 which was in the notch 34, but is now in the notch 35 and retains said latch with its beak projecting beyond the disk periphery. As the rotation of the disk continues, the latch is oscillated, as its beak passes the abutments 23, without otherwise changing its position. The latch is now ready to lock the disk to the section 2, said section meanwhile having been prevented from rotating by the pawl 80 and the teeth 8, which it does after the retriever spring 9 has been wound up sufficiently by drawing out still more of the rope. The locking together of the disk and section 2 is effected, upon discontinuing the pull on the rope, when the projecting beak of the latch encounters the first lug 23 in its path as the spring 9 acts to rotate the disk in the direction of arrow 81, in Fig. 3, which encounter forces said latch into the position indicated in said view, the latch sliding on the stud 31 and the heel 32 being received against the V-shaped abutment 33. The latch is thus wedged between the abutment 33 and the contacting abutment 23, and cannot get out of this position without rotation of the disk against the force of the retriever spring. It should be noted that the plunger at this time is bearing on the latch in advance of the apex 79, or between such apex and the forward end of the slot 30 which is bearing on the stud 31, consequently the tendency of said plunger is to so actuate the latch as to bring its beak into the notch 41 out of the way of the abutments 23, but this the plunger is unable to do because of the manner in which the latch is grasped between the abutments 33 and 23 and held by the retriever spring.

Figure 3:
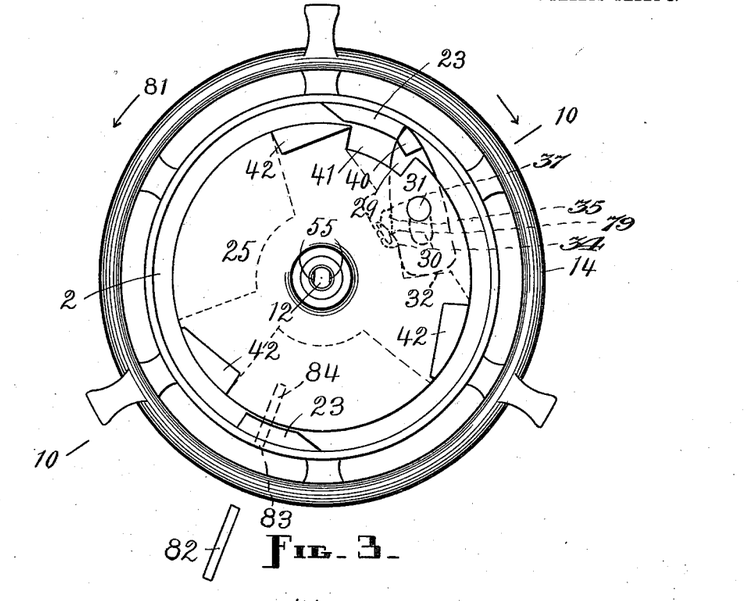
Fig. 3, a front elevation and interior view of the retriever, looking at the retriever disk after the front section of the case and the reel have been removed.
Figure 4:
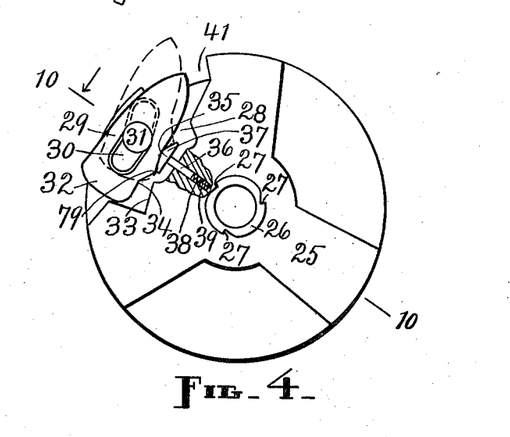
Fig. 4, a rear elevation with a part broken away of said disk, showing the retriever dog or latch, by full and dotted lines, in two of its three or more positions.

The retriever spring 9, which has thus far been only partially wound, is next wound up tight by grasping the hand-grip 14 and rotating the case section 2 in the opposite direction to that indicated by the arrow 81, Fig. 3, the pawl 80 meanwhile clicking past the teeth 8 and finally engaging one of said teeth, at the end of the winding operation, to prevent unwinding. The retriever is now set and ready to operate when the trolley leaves the wire, or the rope 5 receives a sudden jerk or pull. The rope has before this been rewound on the reel 43, and the dogs 60 have been drawn in by the spring 62, but when said rope is again jerked upwardly said dogs fly outward and immediately engage the lugs 42 and impart a slight movement to the disk 25 in the same direction as said reel is actuated by said rope, thus winding the spring 9 a little tighter. Such movement is sufficient to carry the beak of the latch 29, which is in engagement with one of the abutments 23, away from the abutment, and to permit the plunger 26 to act and to rock said latch into the full-line position in Fig. 4, said beak being thus actuated into a position where it cannot encounter said abutments. The disk being thus freed from the section 2, it is revolved by the spring 9 in the direction of the arrow 81, such spring acting immediately after said disk is unlocked from said section, and the rope is wound on the reel, since the latter remains operatively engaged with the disk. The spring 9 expands or unwinds until its force is spent, winding in the rope and drawing down the trolley-pole. During this last operation, the latch heel 32 strikes the abutments 23, one after the other, and the latch 29 is thereby idly oscillated without interfering with the rotation of the disk.

To reset the retriever, draw out the rope and start the disk 25 in the direction to wind the spring 9, the dogs 60 still being in engagement with the lugs 42. Within less than one-half of a revolution of a disk, the latch heel 32 strikes one of the abutments 23 and the latch is forced forward with its beak outward again, then release said rope when the latch beak strikes the abutment behind it, in the direction of winding, and said latch is forced back against the V-shaped abutment 33, all in the manner previously fully explained. The disk and winding section are again locked together or operatively engaged, and the retriever spring is wound up by said section as before. The retriever is now in readiness for a repetition of the retrieving and resetting operations.

It is very evident that the retriever spring can be wound up to much better advantage and more easily and conveniently by means of the case section 2, than by means of a rope, although said spring might, of course, be wound by the latter means, in the manner customary in devices of this kind.

The rope 5 is permitted by the reel 43 and its spring 47 to move up and down with the reel, as the latter follows the undulations of the trolley-wire, said reel winding up said spring when said rope is drawn off, and said spring causing said reel to rewind said rope when it is slackened. The rope is thus kept under tension all the time the trolley is on the wire.

By simply fastening the disk 25 rigidly to the case section 2, the device is converted into a catcher, since the sudden upward movement of the rope 5, caused when the trolley leaves the wire, produces the locking engagement with said disk as before, and inasmuch as said disk is now held against rotation in the winding direction, by the fastening means and the pawl 80 and teeth 8, the reel and rope are always instantly brought to a standstill. The rope is then drawn down, and the reel permitted to release itself from the disk. As a fastening means of this nature and for this purpose, a pin 82 may be provided, and openings made in the rim of the section 2 and through the periphery of the disk 25 into the same to receive such pin, such openings being so arranged that they can be brought into alinement with each other. The pin 82 is shown in Fig. 3, and the openings in the section and in the disk, by dotted lines, at 83 and 84, respectively, in such view.

Figure 11:
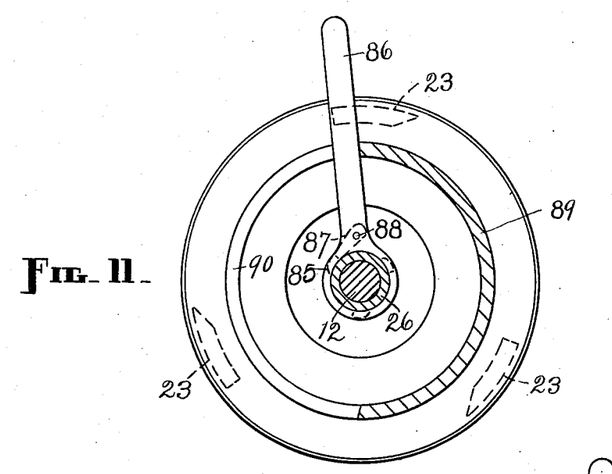
Fig. 11, a rear elevation, in partial section, of certain parts of a retriever which has a modified form of winding or setting mechanism.
Figure 12:
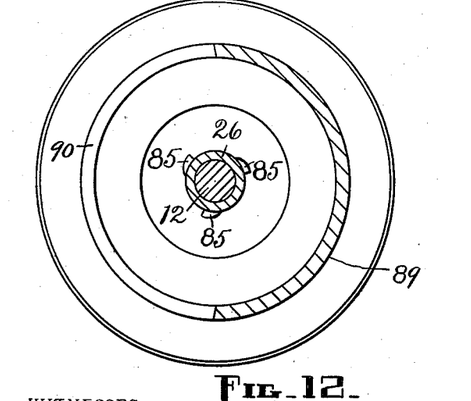
Fig. 12, a similar view without the operating lever or arm.

Instead of employing a rotatable section of the casing for winding the retriever spring, I may provide the disk hub 26 with a plurality of teeth 85 and mount a lever or arm 86 loosely on such hub, providing such arm with a pawl 87, pivoted thereto at 88, to engage and release said teeth. The part of the casing here shown, and represented at 89, has a slot 90 therein to accommodate the arm 86. The other mechanism, of a retriever equipped with this appliance, and the operation of the same are practically the same as in the first instance, but there should be at least three abutments 23, in order to insure speedy engagement with one of them every time the arm 86 is swung into initial position for winding. See Figs. 11, 12 and 13.

Figure 13:
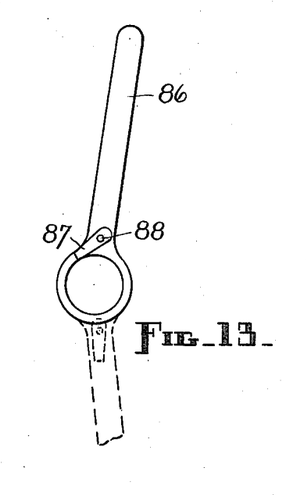
Fig. 13, a front elevation of the arm which forms part of the aforesaid modification, showing said arm, in full and dotted lines, in its two extreme positions.

In practice, the arm 86 from its approximately upright position, with the pawl 87 in engagement with one of the teeth 85, is swung downward to the bottom of the slot 90, into the position indicated by dotted lines, in Fig. 13. This action imparts a partial rotation to the retriever disk, which latter is then held by the disk latch and one of the abutments 23, against the force of the retriever spring being wound by this means, while said arm is swung up again, said pawl meanwhile having become disengaged from the first tooth and engaged with the second tooth. The arm 86 is swung down and up again, and this operation or these operations are repeated as often as is necessary to wind tightly the retriever spring.

Figure 14:
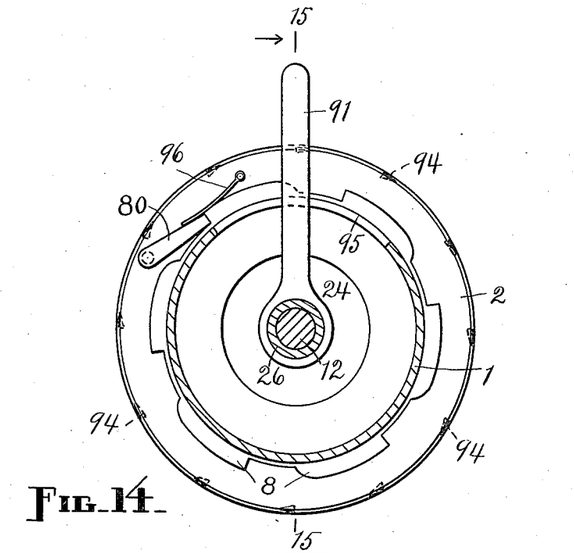
Fig. 14, a rear elevation, in partial section, of still another means for winding or setting the retriever spring from the outside, and, Fig. 15, a vertical section taken on lines 15—15, looking in the direction of the associated arrow, in Fig. 14.
Figure 15:
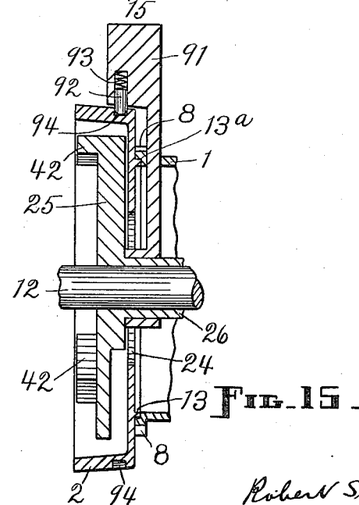

In Figs. 14 and 15, I show another lever action, the lever in this case being used to rotate the winding case section 2. Here a lever or arm 91 is mounted loosely on the retriever disk sleeve, as in the other modification, but this arm is arranged to engage and release the section 2, through the medium of a spring-pressed pin 92. The pin 92 is pocketed in an overhanging part of the arm 91, with a spring 93 arranged to retain the outer end of said pin on the periphery of the section 2. A series of ratchet notches 94 is formed in the periphery of the section 2 for the pin 92, and the arrangement is such that, as the arm 91 is rocked back and forth said pin enters and leaves such notches, and said section is intermittently rotated to wind up the retriever spring. The arm 91 operates in a slot 95 in the back case 1. The hand-grip 14 is omitted, and the pawl 80 is moved down onto the body of the case section 2, a flat spring 96 being employed, in place of the circular spring 18, to force said pawl into engagement with the periphery of the case section 1 and with the teeth 8 thereon. Outside of the differences noted, a retriever which includes the construction just described is operated in a similar manner to the first, and is like the first structurally.

What I claim as my invention, and desire to secure by Letters Patent, is—

1. In a trolley retriever, a suitable casing member provided with a fixed axial member, a retriever disk revolubly mounted on said axial member, a spring arranged between said casing member and disk to actuate the latter in one direction, and means to lock said disk, against the action of said spring, to said casing member and to release it to such action and to rotate said disk on said axial member and wind said retriever spring, from a point exterior of the casing member.

2. In a trolley retriever, a casing consisting in part of a winding section, a retriever disk revolubly mounted in said casing, a spring arranged between a fixed part of said casing and said disk to actuate the latter in one direction, and means to lock said disk and winding section together and to unlock them.

3. In a trolley retriever, a casing consisting in part of a winding section provided with an abutment, a retriever disk revolubly mounted in such casing, a spring arranged between a fixed part of said casing and said disk to actuate the latter in one direction, and a latch carried by said disk and adapted to be actuated into and out of engagement with said abutment, said winding section constituting exterior means for winding said retriever spring while said disk is held by said latch.

4. In a trolley retriever, a casing consisting in part of a winding section provided with an abutment, a retriever disk revolubly mounted in said winding section, a spring arranged between a fixed part of said casing and said disk to actuate the latter in one direction, and a latch carried by said disk and adapted to be actuated into and out of engagement with said abutment to lock said disk and winding section together and to unlock them.

5. In a trolley retriever, a stationary case section provided with a fixed stud, a case section mounted to rotate on said stationary section, a retriever disk revolubly mounted on said stud, a spring arranged between said stationary section and disk to actuate the latter in one direction, means to lock said rotatable section and said disk together and to unlock them, a spring-actuated reel also revolubly mounted on said stud, means operatively to engage said reel with said disk and to disengage such members, and a second stationary case section supported by said stud.

6. In a trolley retriever, a stationary case section having teeth and provided with a fixed stud, a case section mounted to rotate on said stationary section, said rotatable section having an abutment and provided with a pawl to operate in conjunction with said teeth and hold said rotatable section against rotation in one direction, a retriever disk revolubly mounted on said stud and provided with a reciprocatory and oscillatory latch adapted to engage and release said abutment to lock said rotatable section and said disk together and release them, a spring arranged between said stationary section and disk to actuate the latter in one direction, a spring-actuated reel also revolubly mounted on said stud, means operatively to engage said reel with said disk and to disengage such members, and a second stationary case section supported by said stud.

7. In a trolley retriever, a stationary case section having a fixed stud, a case section mounted to rotate on said stationary section, a retriever disk having a hub revolubly mounted on said stud, means to lock said rotatable section and said disk together and to release them, a spring having one end attached to said stationary section and the other end to said hub, a reel also revolubly mounted on said stud, means operatively to engage said reel with said disk and to disengage such members, a member having a hub rigidly secured to said stud, and a spring having one end attached to said reel and the other end attached to said last-mentioned hub.

8. In a trolley retriever, a casing consisting in part of a revoluble section, means to hold said section against rotation in one direction, a spring-actuated retriever disk revolubly mounted in said casing, automatic means to lock said rotatable section and disk together and unlock them, a spring-actuated reel also revolubly mounted in said casing, means to engage and disengage said reel and disk, and means permanently to lock said rotatable section and disk together and convert the retriever into a catcher.

9. The combination, in a trolley retriever, with a suitably mounted winding case section having an abutment, and means to hold said section against rotation in one direction, of a suitably mounted spring-actuated revoluble retriever disk provided with and carrying a reciprocatory and oscillatory latch in operative relation to said abutment.

10. The combination, in a trolley retriever, with a suitable member having an abutment, of a suitably mounted spring-actuated revoluble retriever disk provided with a reciprocatory and oscillatory latch mounted thereon and carried thereby in operative relation to said abutment, said disk being further provided with means to retain the heel of said latch in operative relation to said abutment or the beak of said latch in such relation, according to the position in which such latch is left by said abutment.

11. The combination, in a trolley retriever, with a suitable member having an abutment, of a suitably mounted spring-actuated revoluble retriever disk, a reciprocatory and oscillatory latch mounted on such disk, and means carried by said disk to maintain one or the other end of said latch in operative relation to said abutment.

12. The combination, in a trolley retriever, with a suitable member having an abutment, of a suitably mounted spring-actuated revoluble retriever disk, a reciprocatory and oscillatory latch mounted on such disk, and a spring-pressed plunger carried by said disk and arranged to bear against said latch and to maintain one or the other end of the latch in operative relation to said abutment.

13. The combination, in a trolley retriever, with a suitable member having an abutment, of a suitably mounted revoluble retriever disk provided with a stud, a spring for such disk, a slotted latch mounted on said stud and having notches in its inner edge, and a spring-pressed plunger carried by said disk and arranged to bear against said notched edge of said latch and to maintain one or the other end of the latch in operative relation to said abutment, said disk having an abutment to receive the heel of the latch when the disk is under the influence of its spring and the beak of the latch is engaged by said first-mentioned abutment.

14. A retriever casing comprising separated back and front fixed sections and an intervening rotatable section, and suitable retriever mechanism with which said rotatable section coöperates, substantially as shown.

15. The combination, in a retriever, of a casing comprising back and front sections and a winding section for retriever mechanism, a stud fixed to said back section, said winding section being mounted on said back section and said front section being supported by said stud, and retriever mechanism mounted on said stud within said casing.

16. A retriever casing comprising back and front fixed sections and a winding section for the mechanism, said winding section being provided with a peripheral hand-grip, in combination with suitable retriever mechanism within said casing and in operative relation to said winding section.

17. The combination, in a trolley retriever, with a fixed case section provided with teeth, of a winding case section provided with a pawl adapted to engage with said teeth to hold said winding section against rotation in one direction, a spring-actuating disk mounted in said winding section, and releasable means to lock said disk to said winding section.

ROBERT SHIELDS.

Witnesses:
F. A. CUTTER,
A. C. FAIRBANKS.

---

Copies of this patent may be obtained for five cents each, by addressing the "Commissioner of Patents, Washington, D. C."